March 18, 1941.  J. G. BAKER  2,235,393

CRANKSHAFT BALANCING

Filed Feb. 25, 1939  2 Sheets-Sheet 1

WITNESSES:

INVENTOR
John G. Baker.
BY
Paul E. Friedemann
ATTORNEY

March 18, 1941.                    J. G. BAKER                    2,235,393
                              CRANKSHAFT BALANCING
                    Filed Feb. 25, 1939           2 Sheets-Sheet 2
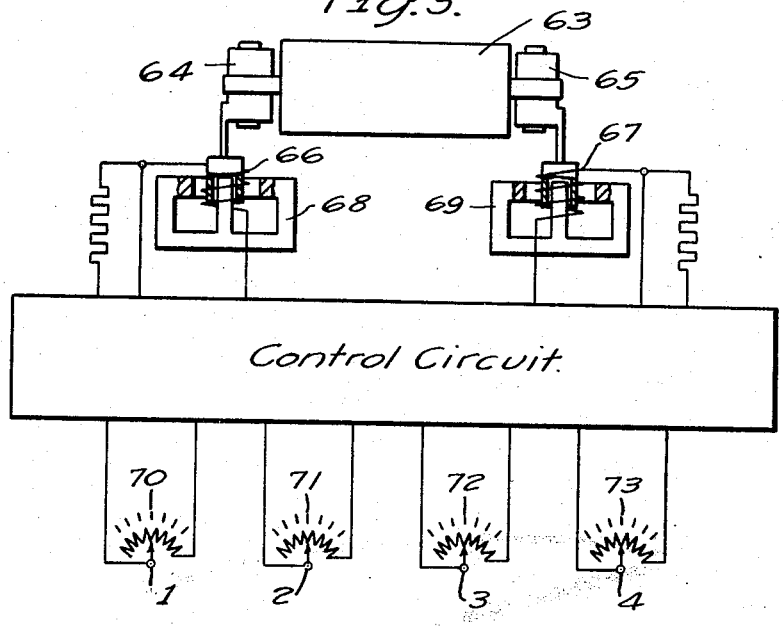
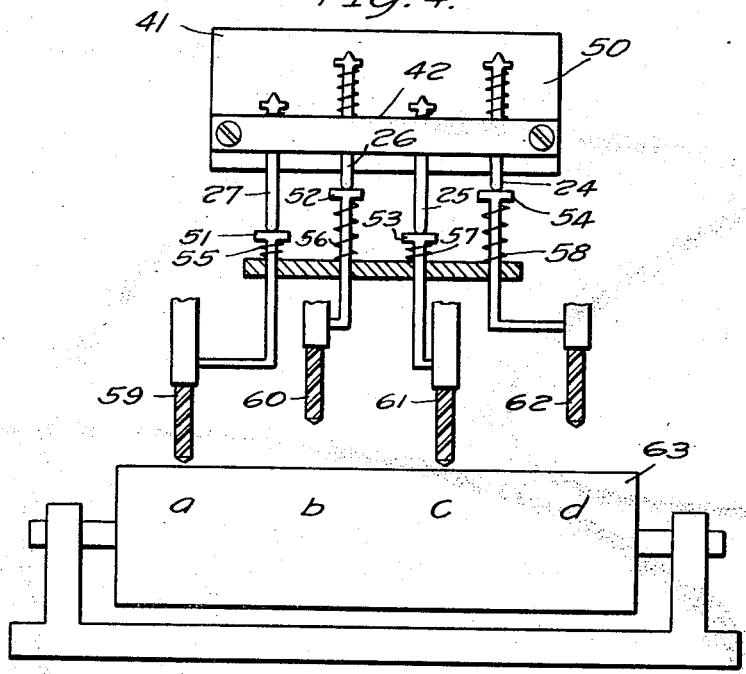
WITNESSES:                                            INVENTOR
                                                    John G. Baker
                                                BY
                                              Paul E. Friedemann
                                                    ATTORNEY Patented Mar. 18, 1941

2,235,393

UNITED STATES PATENT OFFICE 2,235,393

CRANKSHAFT BALANCING

John G. Baker, Evansville, Wis., assignor to Westinghouse Electric & Manufacturing Company, East Pittsburgh, Pa., a corporation of Pennsylvania Application February 25, 1939, Serial No. 258,511

11 Claims. (Cl. 73—53)

My invention relates to a machine element balancing mechanism, more particularly to mechanisms which are adapted to automotive crankshaft balancing or other high production work.

In industries engaged in large scale production of rotatable parts, such as the automotive industry, it is highly important to employ a simple and speedy means for balancing parts which are adapted to rotate at high speeds, such as crankshafts.

An object of my invention is to provide a means for metering corrections necessary on certain parts of a high speed rotating body, such as a crankshaft.

Another object of my invention is to provide a correction indicating means which will form a pattern of the corrections indicated by the metering means and which can be detachable from the metering means and applied directly to a drilling machine, setting up the drilling machine in accordance with the correction indicating means so that the drilling machine will be enabled to remove portions of the crankshaft in strict accordance to the pattern set up by the metering means thereby balancing the crankshaft.

Other objects and advantages will become more apparent from a study of the following specification when considered in conjunction with the accompanying drawings, in which:

Fig. 3 is a schematic showing of a system for indicating unbalance corrections;

Fig. 4 is a schematic showing of a system for setting up drills in accordance with unbalance corrections to be made on a particular rotor.

Figure 1:
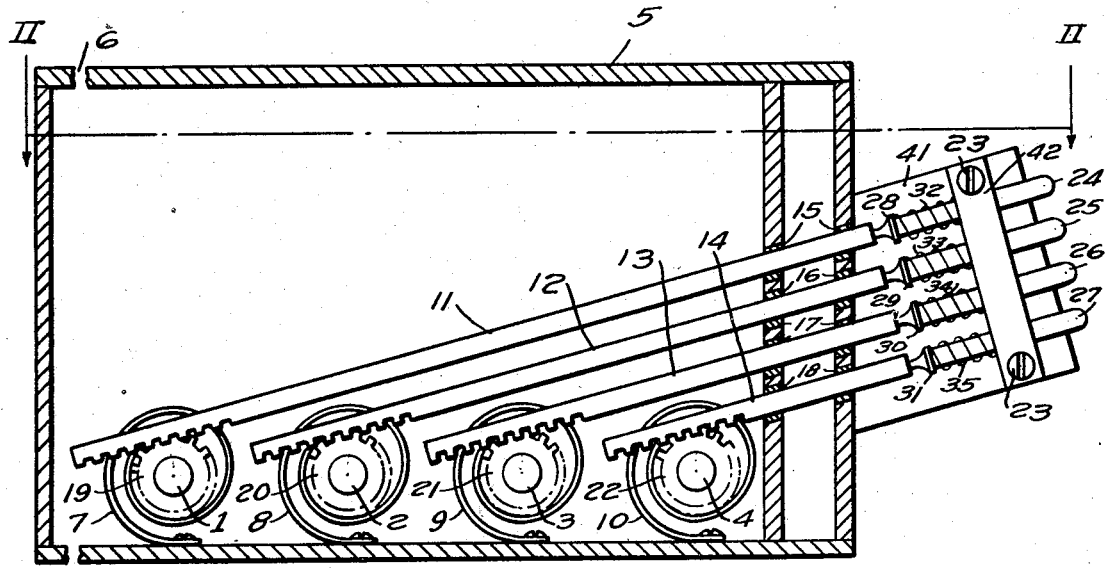
Figure 1 is a view in cross section of a device embodying my invention.
Figure 2:
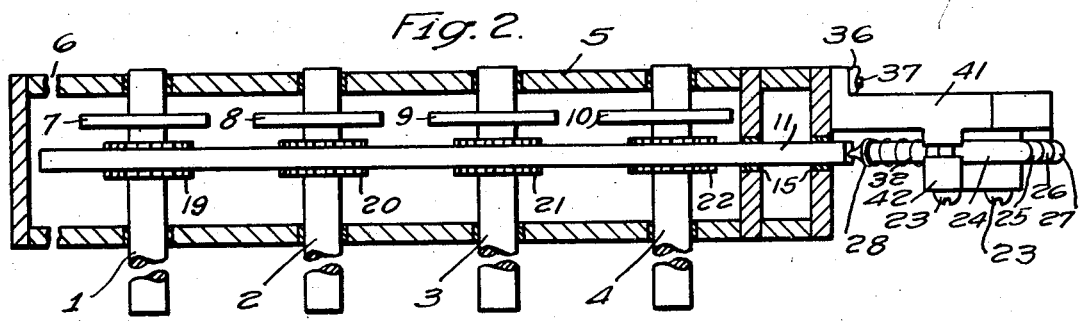
Fig. 2 is a cross sectional view taken along the line II—II of Fig. 1.

Referring to Figs. 1 and 2 a housing 5 which is shown broken away at 6, indicates a portion of the meter housing. A plurality of shafts 1, 2, 3 and 4 are rotatably mounted in said housing. These shafts 1, 2, 3 and 4 are connected to unbalance measuring means schematically shown in Fig. 4 so that their angular displacements are proportional to the component corrections necessary at a number of points on a body such as a crankshaft or other rotor which is to be dynamically balanced. Any suitable measuring means may be used for securing angular displacement of each of these shafts in accordance with a correction which is to be made at a particular point on a body which is to be dynamically balanced. Suitable measuring means for this purpose are described in my copending application, Serial No. 46,312, filed October 23, 1935, now Patent No. 2,165,024, entitled "Indicating balancing machines," or in my co-pending application, Serial No. 263,703, filed March 23, 1939, entitled "Apparatus and method for balancing."

Each of the spiral springs 7, 8, 9 and 10 has one end connected to each of the respective shafts and the other end rigidly connected to the housing 5. Shafts 1, 2, 3 and 4 have rigidly mounted thereon pinions 19, 20, 21 and 22, respectively, which are adapted to drive in a longitudinal direction racks 11, 12, 13 and 14, respectively, which racks extend through the housing at points 15, 16, 17, and 18, respectively. External of the housing is a clamp comprising members 41 and 42 which are held together by screws 23. Slidable in said clamp are plungers 24, 25, 26 and 27, each of which has a circumferential shoulder 28, 29, 30 and 31, respectively, and helical springs 32, 33, 34 and 35, respectively. One end of each of the springs is restrained, respectively, from longitudinal movement by the said shoulders and the other ends of each spring abut against a portion of members 41 and 42, thus forcing the plunger in the direction of the housing. The member 41 is detachably secured to housing 5 by a number of screw threaded members 37 emerging from said housing and wing nuts 36 which are screwed onto said members.

The operation of the device is as follows. The longitudinal displacements of racks 11, 12, 13 and 14 are in proportion to the angular displacements of shafts 1, 2, 3 and 4, respectively. These longitudinal displacements are transmitted to plungers 24, 25, 26 and 27, respectively. Hence, plungers 24, 25, 26 and 27 are displaced in proportion to the angular displacements of shafts 1, 2, 3 and 4, respectively. After these displacements have been secured, members 41 and 42 are clamped together by screws 23, thereby holding the plungers from relative movement longitudinally. The whole assembly is now detached from the housing by unscrewing wing nuts 36. This assembly as a unit can now be placed in a drilling machine where the plungers 24, 25, 26 and 27 can force the depths of four corresponding drill spindles. In other words, the key assembly or gauge retains the indication of the balancing meter in such a way as to enable the drilling machine to be set up with it. Any suitable means may be used for setting up the drilling machine so that the depth of drilling of each drill applied at a particular point on the crankshaft or other rotor corresponds to the unbalance at that point (i. e., the heavier the overbalance, the greater the depth of drilling).

For example, referring to Fig. 4, a key assembly 50, comprising the plungers 24, 25, 26 and 27 clamped between members 41 and 42 and which is patterned in accordance with the unbalance existing in a particular rotor 63, is applied to a plurality of plunger elements 51, 52, 53 and 54 which are urged in an upward direction by springs 55, 56, 57 and 58, respectively, thus vertically disposing or setting a plurality of drills 59, 60, 61 and 62 (shown partially). The drills 59, 60, 61 and 62 are applied as a gang or separately to points a, b, c and d, respectively, of the rotor 63 and are adapted to remove different amounts of material from these points in accordance with the relative depths of drilling as controlled by the key assembly 50. In other words, the key assembly 50 is set in accordance with the unbalance at points a, b, c and d of the rotor 63 and by applying this pattern to the respective drills, corrections can be made at points a, b, c and d, removing excess material therefrom, thus dynamically balancing the rotor. The showing in Fig. 3 is merely diagrammatic and the drill depths are shown somewhat exaggerated simply to clearly show the principle of operation of the device.

Fig. 3 is a schematic showing of a system used for indicating the amount of unbalance at four different points on the rotor 63. The rotor is mounted on two flexible supports 64 and 65 which permit vibration of magnetic pick-up coils 66 and 67, which are adapted to move relative to the magnets 68 and 69, respectively, as the result of the unbalance of the rotor. Voltages are thus indicated in coils 66 and 67 in accordance with the amount of unbalance of the rotor 63 and these voltages are applied in a control circuit (not shown) being ultimately nullified by means of the calibrated potentiometers 70, 71, 72 and 73, the relative angular positions of the shafts of which potentiometers indicate the relative amounts of unbalance at points a, b, c and d, respectively, of the balance rotor 63. In other words, the readings indicated by the contact arms of the potentiometers 70, 71, 72 and 73 are the readings of weights of material to be removed from the respective points on the rotor in order to effect balancing therefor. For a complete showing of the actual circuit used in this system, reference is made to my aforementioned copending applications.

I am, of course, aware that others, particularly after having had the benefit of the teachings of my invention may devise other mechanism embodying my invention, and I, therefore, do not wish to be limited to the specific showings made in the drawings and the descriptive disclosure hereinbefore made but wish to be limited only by the scope of the appended claims and such prior art that may be pertinent.

I claim as my invention:

1. In combination with a meter for indicating dynamic unbalance of a rotor, means for indicating the amount of unbalance at a particular part of the rotor comprising a member which is movable in proportion to the amount of the unbalance at said particular part and a gauge means which is actuated by said movable member and which is adapted to be patterned in accordance with said movable member and said unbalance, said gauge means being readily separable from said machine.

2. In combination with a meter for indicating dynamic unbalance of a rotor comprising a plurality of indicating means, each of which is adapted to register in an amount proportional to the unbalance at a particular point on the rotor, gauge means which is actuated by said unbalance indicating means and patterned thereby to correspond with the registries of said indicating means, said gauge means being readily detachable from said machine.

3. In combination with a meter for indicating dynamic unbalance of a rotor comprising a plurality of shafts each of which is angularly displaceable in an amount proportional to the unbalance at a particular point on the rotor, gauge means which is actuated by said unbalance indicating means and patterned thereby to correspond with the angular displacement of said shafts, said gauge means being readily detachable from said machine and being adapted to set up a drilling machine so as to enable it to drill in such manner as to correct the balance of the rotor.

4. In combination with a meter for indicating dynamic unbalance of a rotor comprising a plurality of shafts each of which is angularly displaceable in an amount proportional to the unbalance at a particular point on the rotor, a plurality of racks one for each of said shafts, each of which is longitudinally displaceable in an amount proportional to the angular displacement of its corresponding shaft, gauge means comprising a plurality of longitudinally displaceable members, one for each of said racks, and each of which is normally in contact with and actuated by one of said racks, the relative displacements of said longitudinally displaceable members being patterned to correspond with the relative displacements of said racks, said gauge means being mounted on but being readily detachable from said machine.

5. In combination with a meter for indicating dynamic unbalance of a rotor at a plurality of different points and including separate longitudinally movable members which are displaceable in proportion to the unbalance at said points, a key assembly comprising, in combination, a clamp, a plurality of plungers which are slidably mounted in parallel relation in said clamp, spring means associated with each of said plungers for normally biasing each of said plungers in contact engagement with one of said longitudinally movable members, one end of said spring means being held by said clamp and the other end thereof being held by a projection from each of said plungers, said clamp including fastening means for restraining said plungers against relative longitudinal displacement and simultaneously holding said spring means in compression.

6. In combination with a meter for indicating dynamic unbalance of a rotor at a plurality of different points and including separate longitudinally movable members which are displaceable in proportion to the unbalance at said points, a key assembly comprising, in combination, a clamp, a plurality of plungers which are slidably mounted in parallel relation in said clamp, each of said plungers having a collar at one end thereof and having encircled therearound a helical spring having one end which is in abutting relation with said clamp and the other end in abutting relation with said collar for normally biasing each of said plungers in contact engagement with one of said longitudinally movable members, said clamp including fastening means for restraining said plungers against relative longitudinal displacement and for holding said springs in compression.

7. In combination with a meter for indicating dynamic unbalance of a rotor at a plurality of different points and including separate longitudinally movable members which are displaceable in proportion to the unbalance at said points, a key assembly comprising, in combination, a clamp, a plurality of plungers which are slidably mounted in parallel relation in said clamp, each of said plungers having a collar at one end thereof and having encircled therearound a helical spring having one end which is in abutting relation with said clamp and the other end in abutting relation with said collar for normally biasing each of said plungers in contact engagement with one of said longitudinally movable members, said clamp including fastening means for restraining said plungers against relative longitudinal displacement and for holding said springs in compression, and readily detachable means on said clamp for permitting ready mounting or dismounting of said key assembly.

8. In combination with a balancing meter comprising a housing and a plurality of shafts enclosed thereby whose angular displacements are each proportional to a correction to be made on a particular point on a body to be dynamically balanced, a pinion on each of said shafts, a plurality of racks each of which is longitudinally driven by one of said pinions, an assembly comprising a plurality of plungers each of which is in contact with and is longitudinally movable in accordance with the rack displacement, a clamp which when loosened allows longitudinal movement of said plungers therethrough and when tightened rigidly holds said plungers from relative movement, and readily detachable means for fastening said assembly to said meter housing.

9. In combination with a balancing meter comprising a housing and a plurality of shafts enclosed thereby whose angular displacements are each proportional to a correction to be made on a particular point on a rotatable body to be dynamically balanced, a pinion on each of said shafts, a helical spring for each of said shafts having one end connected to the shaft and the other end connected to said housing, a plurality of racks, one of which is longitudinally driven by one of said pinions and which extend through said housing, an assembly comprising a clamp, a plurality of plungers which are slidable in said clamp and a spring connected to each of said members, a readily detachable fastening means for fastening said assembly on said housing and for holding said plunger in contact with said racks aided by the force of said last named springs.

10. In combination with a balancing meter comprising a housing and a plurality of shafts enclosed thereby whose angular displacements are each proportional to a correction to be made on a particular point on a body to be dynamically balanced, a pinion on each of said shafts, a plurality of racks each of which is longitudinally driven by one of said pinions, an assembly comprising a clamp, a plurality of plungers which are slidable in said clamp and which have radial projections thereon, a plurality of helical springs each of which has one end fastened to said projection and the other end abutting against a portion of the clamp, readily detachable fastening means for fastening said assembly to said housing, externally thereof and for holding said racks and plungers of the assembly in yieldable contact aided by the force of said last mentioned helical springs.

11. In combination with a balancing meter comprising a housing and a plurality of shafts enclosed thereby whose angular displacements are each proportional to a correction to be made on a particular point on a rotatable body to be dynamically balanced, a pinion on each of said shafts, a helical spring for each of said shafts having one end connected to the shaft and the other end connected to said housing, a plurality of racks, each of which is longitudinally driven by one of said pinions and which extend through said housing, an assembly comprising a clamp, a plurality of plungers which are slidable in said clamp and which have radial projections thereon, a plurality of helical springs each of which has one end fastened to said projection and the other end abutting against a portion of the clamp, readily detachable fastening means for fastening said assembly to said housing externally thereof and for holding said racks and plungers of the assembly in yieldable contact aided by the force of said last mentioned helical springs.

JOHN G. BAKER.